United States Patent [19]

Goff

[11] 3,996,742

[45] Dec. 14, 1976

[54] FLUID FLOW CONTROL APPARATUS

[75] Inventor: Raymon L. Goff, Lafayette, Ind.

[73] Assignee: TRW Inc., Cleveland, Ohio

[22] Filed: Mar. 4, 1976

[21] Appl. No.: 663,768

[52] U.S. Cl. .................................. 60/422; 60/445; 60/484; 137/101; 180/132

[51] Int. Cl.[2] ................... F15B 11/20; F16H 39/46

[58] Field of Search ............ 60/422, 427, 445, 451, 60/484; 180/132; 137/100–101, 625, 625.12

[56] References Cited

UNITED STATES PATENTS

| | | | |
|---|---|---|---|
| 2,737,196 | 3/1956 | Eames | 60/422 X |
| 2,892,311 | 6/1959 | Van Gerpen | 60/422 |
| 2,892,312 | 6/1959 | Allen et al. | 60/450 X |
| 3,703,186 | 11/1972 | Brewer | 137/101 |

*Primary Examiner*—Edgar W. Geoghegan

[57] ABSTRACT

An improved fluid flow control apparatus is utilized in association with a vehicle having a single variable displacement pump for supplying fluid to both a steering apparatus and an auxiliary apparatus. The fluid flow control apparatus includes a pair of variable size orifices one of which is associated with the steering apparatus and the other of which is associated with the auxiliary apparatus. Upon actuation of either the steering or auxiliary apparatus, the size of the associated orifice is varied to provide a variation in a load signal and effect a change in the displacement of the pump. During simultaneous operation of both the steering and auxiliary apparatus, a priority valve assembly is utilized to block fluid flow to the auxiliary apparatus if the fluid output from the pump is insufficient to satisfy the demand for steering fluid. The priority valve assembly includes a main valve member with an internal chamber in which a secondary valve member or piston is disposed. Upon initiation of a steering operation with the auxiliary apparatus in an inactive condition, the secondary valve member moves toward a closed position. If at this time the demand for steering fluid is sufficiently great, the secondary valve member blocks fluid flow to the auxiliary apparatus.

20 Claims, 7 Drawing Figures

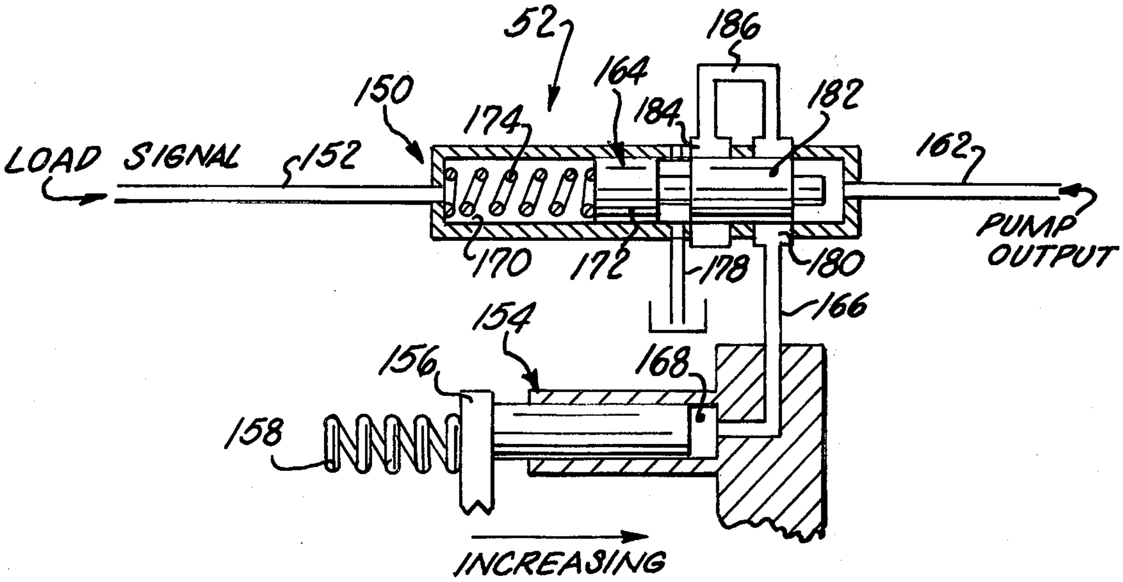
FIG.6
FIG.7
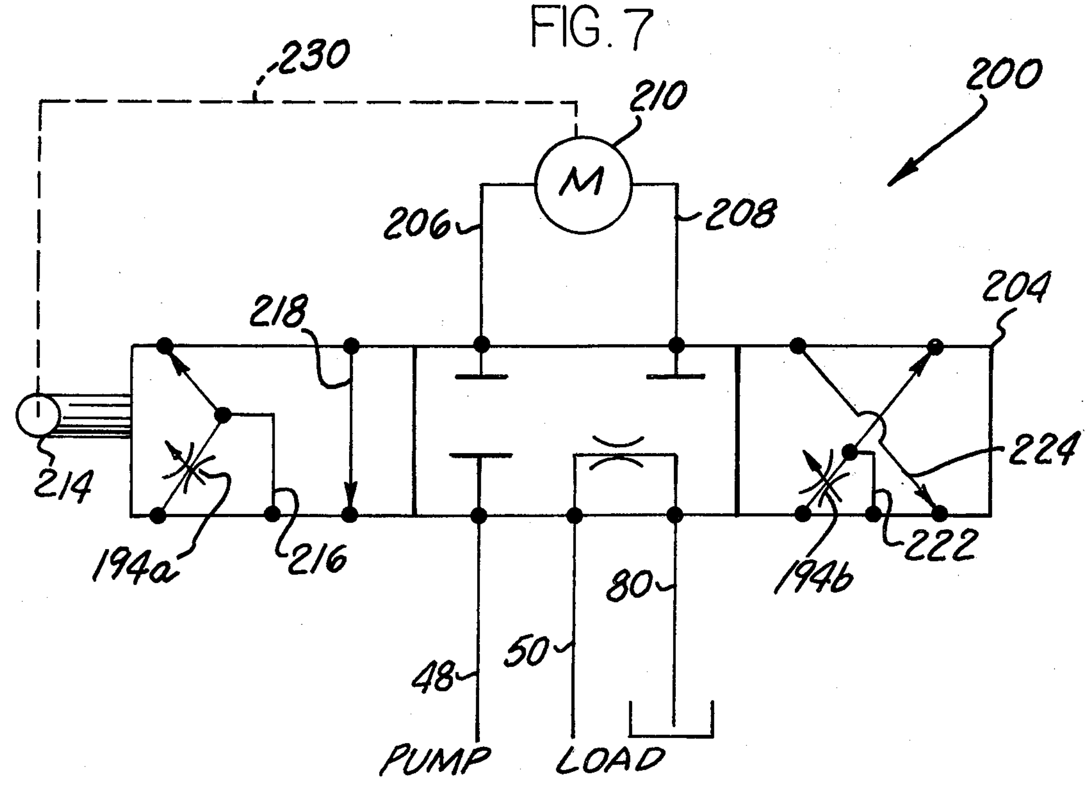

FLUID FLOW CONTROL APPARATUS

BACKGROUND OF THE INVENTION

The present invention relates to an improved fluid flow control apparatus and more specifically to improved fluid flow control apparatus for use in association with a single pump which supplies fluid to both a vehicle steering apparatus and to an auxiliary apparatus.

A known fluid flow control apparatus which is utilized to control the flow of fluid from a single pump to both a vehicle steering apparatus and an auxiliary apparatus is disclosed in U.S. Pat. No. 2,892,311. This known control apparatus includes a priority valve assembly which is effective to insure that sufficient fluid is supplied from the single pump to the steering apparatus during simultaneous operation of both the steering and auxiliary apparatus. The priority valve assembly has a single valve member which is movable in a valve chamber to block fluid flow between an inlet port and a single outlet port in response to a pressure signal which indicates that the demand for fluid by the steering apparatus is not being satisfied. The steering apparatus includes a closed center steering valve which is utilized in association with a steering motor which is continuously connected with reservoir or drain. Therefore, when the steering apparatus is inactive, the steering control motor is connected with drain and is ineffective to hold the steered wheels against movement.

Another fluid flow control apparatus is disclosed in U.S. Pat. No. 3,750,405 and includes a priority valve which is utilized to insure that sufficient fluid is supplied to a steering unit. Still another known fluid flow control system is disclosed in U.S. application Ser. No. 583,591 filed June 4, 1975 by Raymon L. Goff and entitled "Diverter Valve for Power Steering With Power Beyond".

SUMMARY OF THE PRESENT INVENTION

The present invention provides a new and improved flow control apparatus which is utilized in a vehicle having a power steering apparatus and an auxiliary apparatus which are supplied with fluid from the same variable displacement pump. The fluid flow control apparatus includes a first variable size orifice which is associated with the steerinng apparatus and is effective to vary a steering load signal upon a variation in the demand for fluid pressure by the steering apparatus. A second variable size orifice is associated with the auxiliary apparatus and is effective to vary an auxiliary apparatus load signal upon a variation in the demand for fluid by the auxiliary apparatus. A pump displacement control assembly is actuated in response to a variation in either the steering load signal or the auxiliary apparatus load signal to effect a variation in the displacement of the pump.

A priority valve assembly is connected with the steering apparatus and the auxiliary apparatus to insure that the steering apparatus is supplied with sufficient fluid at all times. The priority valve assembly includes a pair of relatively movable valve members which at least partially define a chamber connected in fluid communication with the steering apparatus. These relatively movable valve members cooperate with a pair of outlet ports which are connected in fluid communication with the auxiliary apparatus.

Upon initiation of a steering operation requiring the entire fluid output from the pump, the pressure in the priority valve chamber increases and relative movement occurs between the valve members to block fluid flow through the pair of outlet ports to the auxiliary device until after the demand for steering fluid has been satisfied. Upon initiation of operation of the auxiliary apparatus with the steering apparatus inactive, fluid is initially supplied to the auxiliary apparatus through one of the pair of outlet ports and is subsequently supplied to the auxiliary apparatus through both of the pair of ports. If the steering apparatus is activated during operation of the auxiliary apparatus, the relatively movable valve members block both of the outlet ports and pressure signal is utilized to effect an increase in the output of a variable displacement pump. When the output of the variable displacement pump has increased to satisfy the demand for steering fluid, the valve members move so that fluid is again supplied to the auxiliary apparatus.

Accordingly, it is an object of this invention to provide a new and improved fluid flow control apparatus which is utilized in a vehicle having a power steering apparatus and an auxiliary apparatus which are supplied with fluid from the same variable displacement pump and wherein the fluid flow control apparatus includes a first variable size orifice to provide a steering load signal, a second variable size orifice to provide an auxiliary apparatus load signal and a displacement control assembly which is effective to vary the displacement of the pump in response to the variation in either the steering load signal or the auxiliary apparatus load signal.

Another object of this invention is to provide a new and improved fluid flow control apparatus which is used in a vehicle having a power steering apparatus and an auxiliary apparatus which are supplied with fluid from the same pump and wherein the fluid flow control apparatus includes a pair of relatively movable valve members which at least partially define a chamber to which fluid pressure is directed upon initiation of a steering operation to effect movement of at least one of the valve members to at least partially block fluid flow from the pump to the auxiliary apparatus until after the demand for steering fluid has been satisfied.

Another object of this invention is to provide a new and improved fluid flow control apparatus which is utilized in a vehicle having a power steering apparatus and an auxiliary apparatus which are supplied with fluid from the same pump and wherein the fluid flow control apparatus includes a pair of outlet ports which are connected in fluid communication with the auxiliary apparatus, the auxiliary apparatus being supplied with fluid from a first one of the pair of outlet ports upon initiation of operation of the auxiliary apparatus and being supplied with fluid from both of the ports during continued operation of the auxiliary apparatus and wherein a pair of valve members are movable to block the two outlet ports upon initiation of a steering operation requiring the entire output of the pump.

BRIEF DESCRIPTION OF THE DRAWINGS

The foregoing and other objects and features of the present invention will become apparent upon a consideration of the following description taken in connection with the accompanying drawing wherein:

FIG. 6 is a schematic illustration depicting the construction of a control assembly for varying the displacement of the pump in response to either a variation in a steering load signal or a variation in an auxiliary apparatus load signal; and FIG. 7 is a schematic illustration depicting the construction of a valve assembly utilized to effect a variation in a load signal.

DESCRIPTION OF ONE SPECIFIC PREFERRED EMBODIMENT OF THE INVENTION

Figure 1:
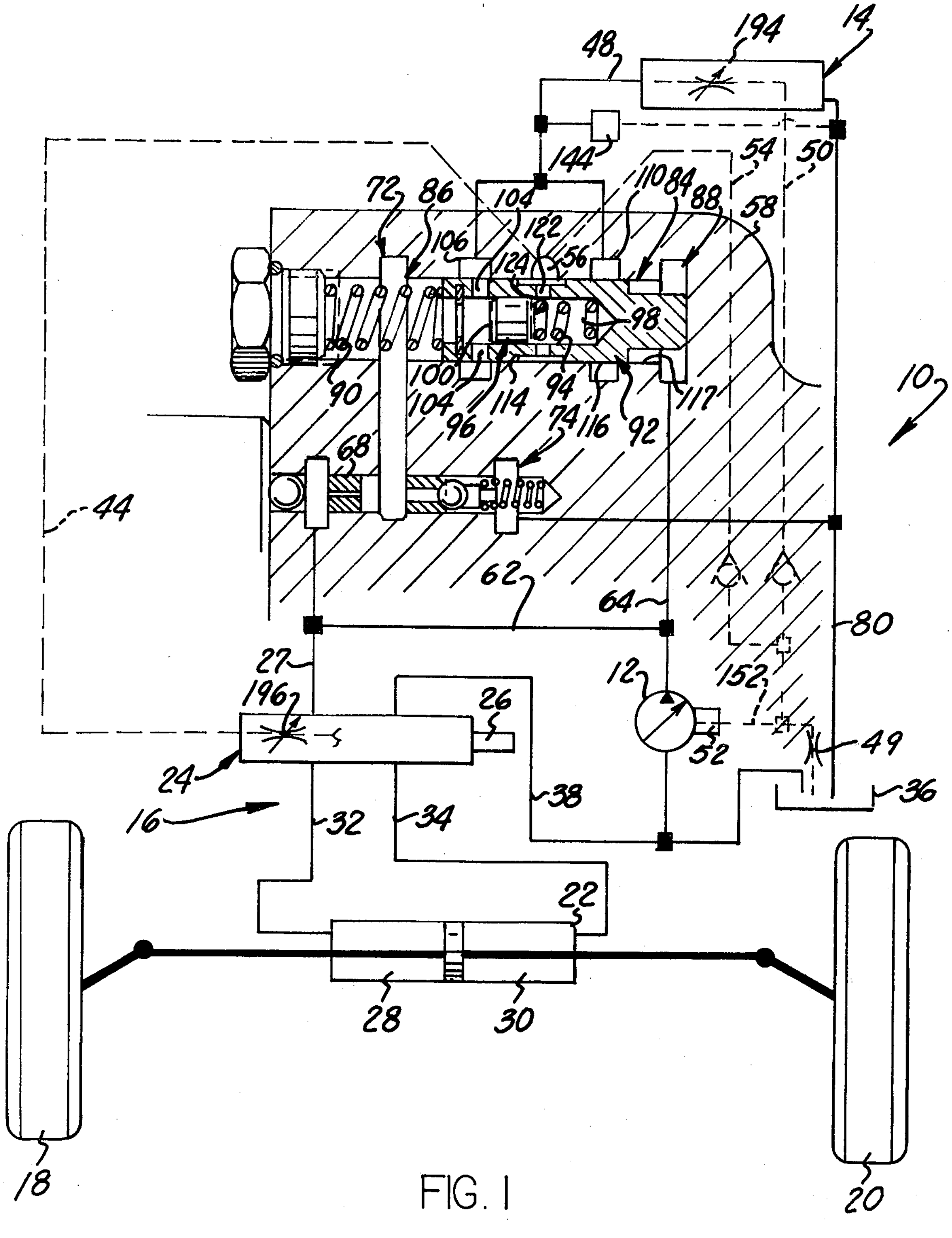
FIG. 1 a schematic illustration of a fluid flow control apparatus constructed in accordance with the present invention, the apparatus being illustrated in an initial condition in which both a power steering apparatus and an auxiliary apparatus are in an inactive condition.

A fluid flow control apparatus 10 constructed in accordance with the present invention is utilized in association with a vehicle having a variable displacement pump 12 which is operated to supply fluid under pressure to both an auxiliary apparatus 14 and a power steering apparatus 16. During turning of vehicle wheels 18 and 20, a power steering motor 22 is operated under the influence of a metered flow of fluid from a closed center steering controller 24. The steering controller 24 has an input shaft 26 which is connected with the steering wheel of a vehicle in a known manner.

Upon rotation of the steering wheel, a gerotor gear set in the controller 24 directs a metered flow of high pressure fluid from a supply conduit 27 to one of a pair of motor cylinder chambers 28 and 30 through one of a pair of conduits 32 and 34. The controller 24 is also effective to connect the other one of the pair of motor chambers 28 or 30 with reservoir or drain 36 through a return conduit 38. The controller 24 may be constructed in a manner similar to that disclosed in U.S. patent application Ser. No. 521,209 filed Nov. 6, 1974 by Jim Lee Rau and Laurence Lockhart Miller and entitled Controller Assembly now U.S. Pat. No. 3,931,711.

A steering load signal, corresponding to the fluid pressure supplied to the controller 24 through the conduit 27, is transmitted from the steering controller 24 to the fluid flow control apparatus 10 through a conduit 44. Upon interruption of rotation of the steering wheel, the controller 24 blocks fluid flow to and from the motor chambers 28 and 30 of the power steering motor 22 to hydraulically lock the wheels 18 and 20. In addition, the fluid pressure in the conduit 44 is reduced to the relatively low drain or reservoir pressure.

During operation of the auxiliary apparatus 14, which may be a backhoe or other implement, fluid pressure is supplied to the auxiliary apparatus through a conduit 48. The controls for the auxiliary apparatus 14 and steering apparatus 16 are both of the closed center type and, when the auxiliary and steering apparatus are in an inactive condition, relatively low drain pressure is transmitted through a bleed-off orifice 49 to a pump displacement control assembly 52. Upon activation of the auxiliary apparatus 14, a relatively high fluid pressure auxiliary apparatus load signal is transmitted to the pump displacement control assembly 52 through a conduit 50 to effect an increase in the displacement of the pump 12 with a resulting increase in the rate at which fluid is discharged from the pump to satisfy the demand for fluid by the auxiliary apparatus 14. Upon activation of the steering control apparatus 16, a relatively high pressure steering apparatus load signal is transmitted from the steering controller 24 through the conduit 44 to the conduit 54 through a groove 56 in a housing 58 of fluid flow control apparatus 10. The relatively high pressure in the conduit 54 effects operation of the control assembly 52 to increase the displacement of the pump 12 to satisfy the demand of the steering apparatus 16 for fluid. The fluid pressures in the conduits 50 and 54 are reduced to relatively low drain pressure through the bleed orifice 49 upon completion of operation of the auxiliary apparatus 14 and steering apparatus 16.

When the auxiliary apparatus 14 and steering apparatus 16 are in the initial or inactive condition illustrated in FIG. 1, the pump 12 is in a minimum displacement condition and the fluid flow control apparatus 10 is supplied with fluid under pressure from the pump 12 through conduits 62 and 64. The conduit 62 is connected in fluid communication with an orifice 68 in the housing 58 of the fluid flow control apparatus 10. The downstream side of the orifice 68 is connected in fluid communication with priority valve chamber 72 and with a high pressure relief valve assembly 74. At this time, neither the auxiliary apparatus 14 or the steering control apparatus 16 is demanding fluid.

A priority valve assembly 84 is disposed within the valve chamber 72. The priority valve assembly 84 is urged to the initial position illustrated in FIG. 1 under the influence of fluid pressure in a variable volume chamber 86 disposed at a left end (as viewed in FIG. 1) of the cylindrical priority valve chamber 72. The opposite or right end of the priority valve assembly 84 (as viewed in FIG. 1) is exposed to fluid pressure in a second variable volume chamber 88. The fluid pressure in the left variable volume chamber 86 is the same as the fluid pressure in the right variable volume chamber 88 since they are both connected with the pump 12 by the conduits 62 and 64 and there is no flow through the orifice 68. Therefore, the combined influence of the fluid pressure in the left variable volume chamber 86 and a biasing spring 90 is effective to overcome the fluid pressure in the chamber 88 and the priority valve assembly 84 is held in the initial position of FIG. 1.

When the fluid flow control apparatus is in the initial condition of FIG. 1, the priority valve assembly 84 is effective to direct fluid pressure to the conduit 48 which is connected with the auxiliary apparatus 14. The priority valve assembly 84 includes a cylindrical main valve spool or member 92 having a cylindrical axially extending internal chamber 94 in which a secondary valve member or piston 96 is disposed in a coaxial relationship with the main valve member 92. A biasing spring 98 is disposed within the chamber 94 and urges the cylindrical piston or secondary valve member toward the left (as viewed in FIG. 1).

When the fluid flow control apparatus 10 is in the initial condition of FIG. 1, the fluid pressure in the left variable volume chamber 86 is applied against the circular end face 100 of the piston 96 and is effective to cause the piston 96 to compress the coil spring 98 so that a radially extending port 104 in the valve member 92 is open. The open port 104 in the main valve member 92 is, at this time, aligned with an annular groove 106 which is connected in fluid communication with the auxiliary apparatus 14. Therefore, the fluid pressure in the left variable volume chamber 86 is ported to the auxiliary apparatus 14 when the auxiliary apparatus is in an initial or inactive condition. It should be noted that fluid pressure from the pump 12 is always conducted to the steering apparatus 16 through the conduits 27 and 62. Since the auxiliary apparatus 14 and steering apparatus 16 are of the closed center type, there is no fluid flow through the conduits 48 and 27 when the auxiliary apparatus and steering apparatus are in their inactive conditions.

Figure 2:
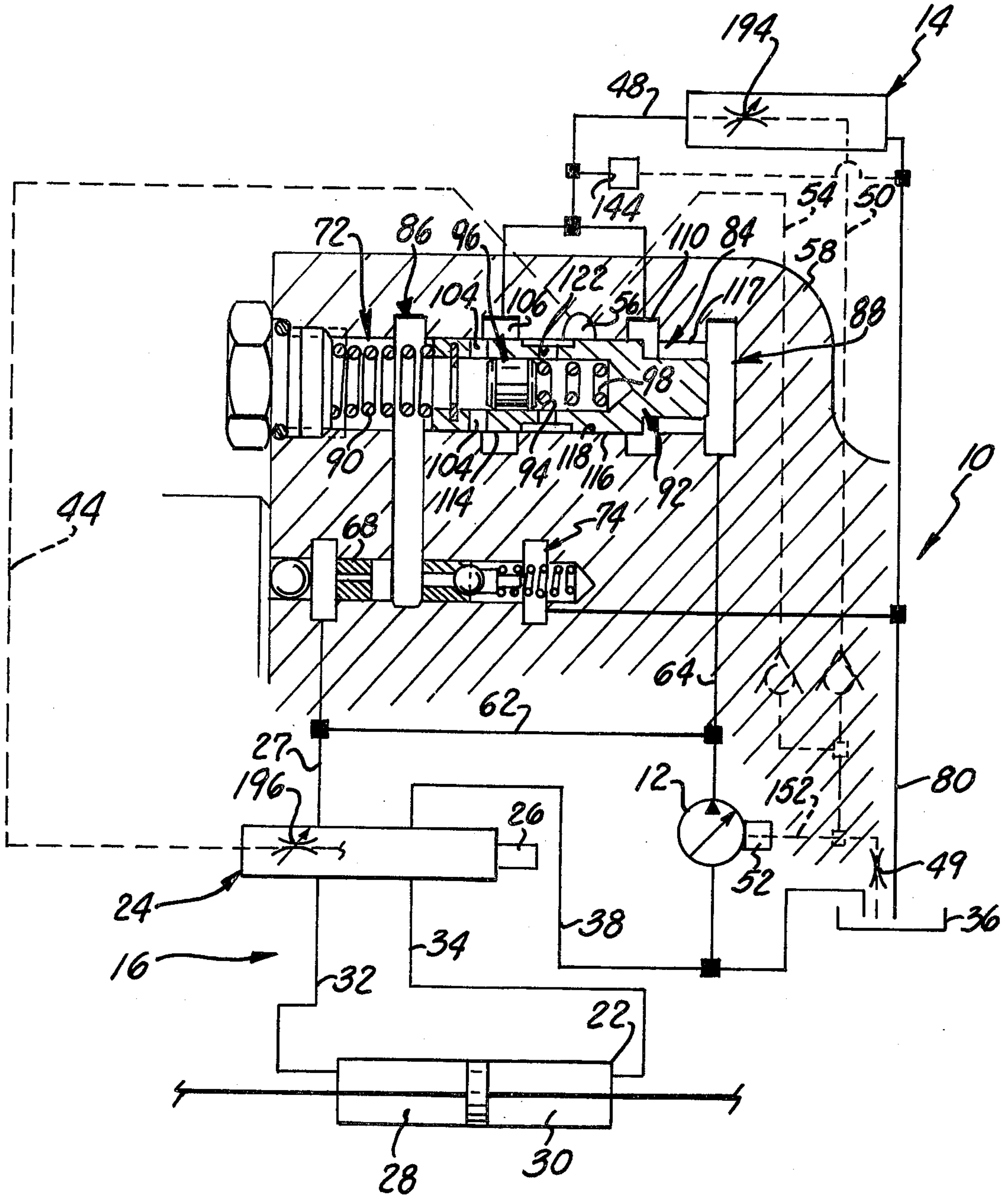
FIG. 2 is a schematic illustration, generally similar to FIG. 1, illustrating the condition of the fluid flow control apparatus during operation of the auxiliary apparatus and with the power steering apparatus in an inactive condition.

Upon initiation of operation of the auxiliary apparaus 14, the fluid flow control apparatus 10 is operated from the initial condition of FIG. 1 to the condition illustrated in FIG. 2. Thus, upon actuation of a suitable control valve to initial operation of the auxiliary apparatus 14, fluid flows from the left variable chamber 86 (FIG. 1) through the opening 104 in the main valve member 92 to the annular valve port 106, the conduit 48, and to the auxiliary apparatus. This fluid flow effects actuation of a suitable hydraulic motor in the auxiliary apparatus. In addition, fluid is exhausted from the auxiliary apparatus 14 to the reservoir 36 through the return or drain conduit 80.

Since the orifice 68 restricts the flow of fluid from the pump supply conduit 62 to the left variable volume chamber 86, the flow of fluid to the auxiliary apparatus 14 causes the fluid pressure in the left variable chamber to decrease relative to the fluid pressure in the right variable volume chamber 88. This enables the fluid pressure in the right variable volume chamber.88 to move the main valve member 92 leftwardly from the closed or initial position illustrated in FIG. 1 to an actuated or open position illustrated in FIG. 2. Fluid can then flow from the right variable volume chamber 88 through a previously closed port 110 to the conduit 48 and the auxiliary apparatus 14. It should be noted that a cylindrical land 114 on the main valve member 92 does not block the port 106 so that fluid flows to the auxiliary apparatus 14 through both of the ports 106 and 110. This flow of fluid from the left chamber 86 makes the orifice 68 effective to maintain pressure differential between the chambers 86 and 88.

Initiation of operation of the auxiliary apparatus 14 causes an auxiliary apparatus load signal to be transmitted through the conduit 50 to effect operation of the control assembly 52 to increase the displacement of the pump 12. When the auxiliary apparatus 14 and steering apparatus 16 are inactive, relatively low pressure load signals are transmitted to the conduit 50. Upon actuation of the auxiliary apparatus 14, a relatively high pressure auxiliary apparatus load signal is transmitted to the conduit 50. The resulting increase in pressure in the conduit 50 effects operation of the control assembly 52 to increase the displacement of the pump 12.

When the displacement of the pump 12 is sufficient to supply the demand for fluid by the auxiliary apparatus 14, the auxiliary apparatus load signal is balanced and the control assembly 52 maintains the displacement of the pump 12 constant. If the demand for fluid by the auxiliary apparatus 14 is increased, the fluid pressure in the conduit 50 increases to effect an increase in the displacement of the pump 12. Conversely, if the demand for fluid pressure by the auxiliary apparatus decreases, the fluid pressure in the conduit 50 decreases and pump displacement control assembly 52 is effective to decrease the displacement of the pump 12.

Once the displacement of the pump 12 has been adjusted to a displacement corresponding to the demand of the auxiliary apparatus 14, relatively small changes in demand for fluid by the auxiliary apparatus 14 are quickly accommodated by a modulating action between a cylindrical land 116 on the main valve member 92 and a cylindrical housing shoulder 117. Thus, if the demand for fluid by the auxiliary apparatus 14 increases slightly, the resulting reduction in fluid pressure in the conduit 48 is transmitted to the ports 106 and 110. Due to the effect of the orifice 68, the flow of fluid from the pump 12 to the left variable chamber 86 is retarded so that the pressure in the chamber 86 is decreased slightly relative to the pressure in the right variable chamber 88. This increase in the fluid pressure in the right chamber 88 relative to the pressure in the left chamber 86 (as viewed in FIG. 2) increases the size of the annular opening between the valve spool land 116 and the housing shoulder 117 with a resulting increase in the rate of flow of fluid to the auxiliary apparatus 14. As this occurs, the fluid pressure in the right variable chamber 88 decreases somewhat and the fluid pressure in the left variable chamber 86 increases. Therefore, the main valve member 92 moves slightly leftward (as viewed in FIG. 2) to a position in which the demand for fluid by the auxiliary apparatus 14 is satisfied.

If the demand for fluid by the auxiliary apparatus 14 decreases, the resulting increase in fluid pressure in the conduit 48 is transmitted to the ports 106 and 110. Due to the effect of the orifice 68, the pressure in the left chamber 86 increases slightly relative to the pressure in the right chamber 88. This decrease in the fluid pressure in the right chamber 88 relative to the pressure in the left chamber 86 causes main valve member 92 to shift toward the right (as viewed in FIG. 2) to decrease the size of the annular opening between the valve spool land 116 and the housing shoulder 117 with a resulting decrease in the rate of flow of fluid to the auxiliary apparatus 14. As this occurs, the fluid pressure in the right chamber 88 increases somewhat as the fluid pressure in the left chamber 86 decreases so that the main valve member 92 moves slightly rightward (as viewed in FIG. 2) to a position in which the demand for fluid by the auxiliary apparatus 14 is satisfied.

Upon interruption of the operation of the auxiliary apparatus 14, a suitable implement control valve is closed to block fluid flow through the conduit 48. This results in a bleeding off to drain through the orifice 49, of the fluid pressure in the conduits 48 and 50. As the fluid pressure in the conduit 50 is reduced, the displacement control assembly 52 is actuated to reduce the displacement of the pump 12 to a minimum displacement condition.

When the operation of the auxiliary apparatus is interrupted, the fluid flow through the left chamber 86 is blocked. This renders the orifice 68 ineffective so that the fluid pressure in the left chamber 86 increases.

As this occurs, the main valve member 92 is shifted to the right and the fluid flow control apparatus 10 returns to the initial condition of FIG. 1. The fluid flow control apparatus 10 will remain in the initial condition of FIG. 1 until the auxiliary apparatus 14 or steering apparatus 16 are operated.

Upon initiation of operation of the steering apparatus 16 with the auxiliary apparatus 14 inactive and the fluid flow control apparatus 10 in the initial condition of FIG. 1, the input shaft 26 to the steering controller 24 is rotated. This operates a control valve within the steering controller 24 to port a metered flow of fluid through one of the conduits 32 or 34 to the steering motor 22 and to connect the other conduit with drain through the return conduit 38. Actuation of the steering controller 24 is also effective to port a steering load pressure signal through conduit 44 to the annular groove or port 56 in the valve housing 58. The fluid pressure conducted through the conduit 44 to the port 56 in the housing 58 varies as a function of variations in the demand for fluid by and/or the load on the steering apparatus 16. Thus, if the steering apparatus 16 is actuated to demand fluid at a relatively high fluid flow rate, a relatively high pressure steering load signal is transmitted through the conduit 44. However, if the steering apparatus 16 is actuated so as to demand fluid at relatively low flow rate, a relatively low pressure steering load signal is transmitted through the conduit 44.

If the controller 24 is actuated to demand steering fluid at a high flow rate, the steering load signal from the controller 24 temporarily actuates the priority valve assembly 84 to block fluid flow to the auxiliary apparatus 14 until the displacement of the pump 12 is sufficient to satisfy the demand for steering fluid. Thus, the increased fluid pressure signal is conducted from the port 56 through a radially extending passage 122 (FIG. 3) in the main valve member 92 into the inner variable volume chamber 94. This pressure is applied against a circular end face 124 of the secondary valve member 96. The fluid pressure in the left variable volume chamber 86 is the same as the fluid pressure in the pump supply conduit 62 since the auxiliary apparatus 14 is inactive. However, the secondary valve member 96 is shifted leftwardly (as viewed in FIG. 3) to the closed position illustrated in FIG. 5 under tthe combined influence of the spring 98 and the fluid pressure applied to the end face 124.

When the secondary valve member 96 is in the closed position, it blocks fluid flow from the left variable volume chamber 86 through the port 104 in the main valve member 92 to the annular valve port 106 in the housing 58. Therefore if the auxiliary apparatus 14 should be actuated at this time, there will be no fluid flow to the auxiliary apparatus. This is because the closed secondary valve member 96 is blocking the port 106 and the closed main valve member 92 is blocking the port 110.

The relatively high fluid pressure signal from the controller 24 is conducted from the port 56 through the conduit 54 to the motor 52. This pressure effects operation of the motor 52 to increase the displacement of the pump 12. Increasing the displacement of the pump 12 enables it to meet the demand for fluid by the power steering apparatus 16. It should be noted that the steering load pressure signal from the steering controller 24 is utilized to perform the dual functions of moving the secondary priority valve member 96 to the closed position of FIG. 5 and effecting operation of the control assembly 52 to increase the displacement of the pump 12.

Figure 3:
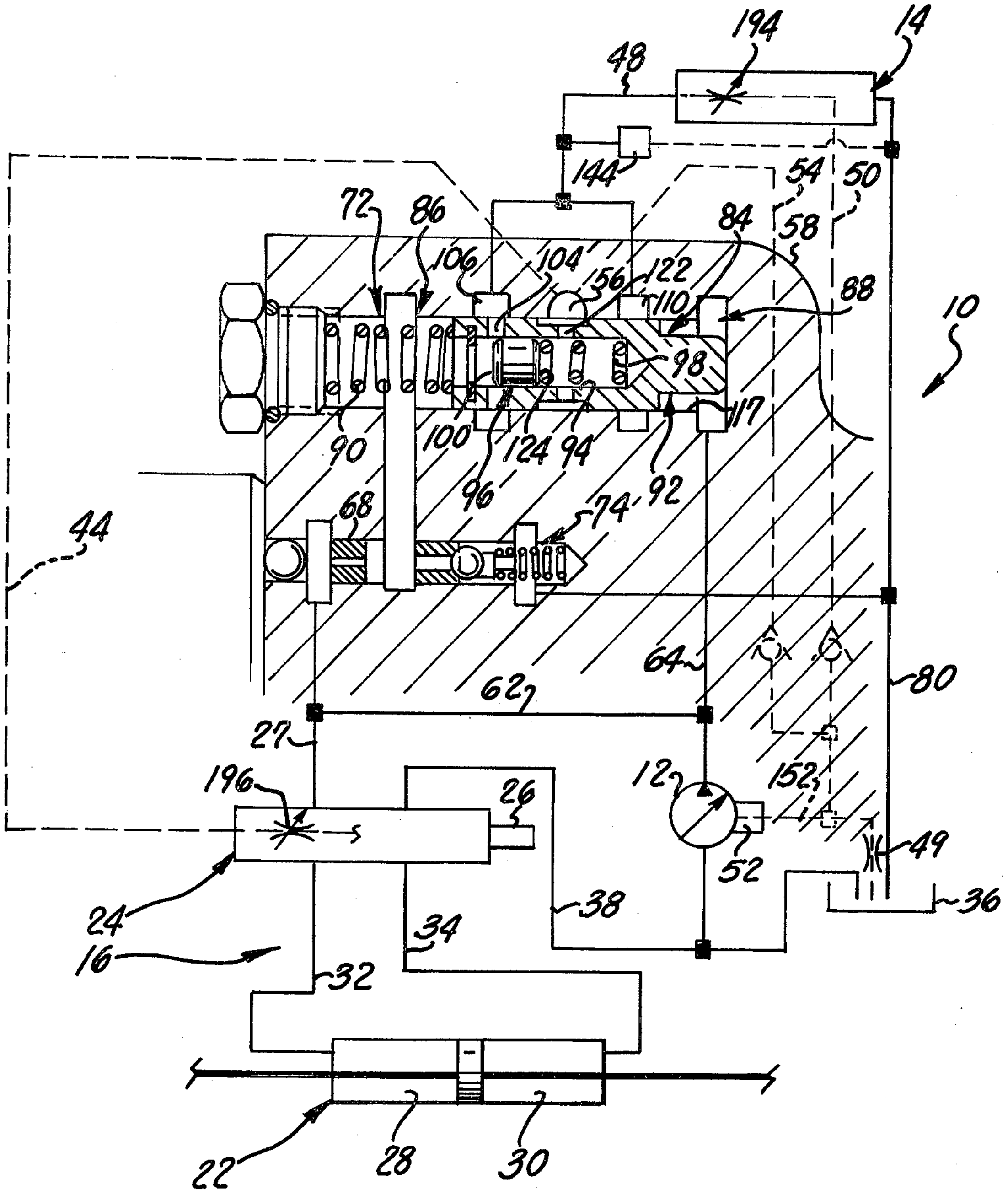
FIG. 3 is a schematic illustration, generally similar to FIG. 1, illustrating the condition of the fluid flow control apparatus during a steering operation with the auxiliary apparatus in an inactive condition.

Any attempt to actuate the auxiliary apparatus 14 before the demand for fluid by the power steering apparatus 16 has been satisfied is blocked by the secondary valve member 96 and the main valve member 92. The main valve member 96 remains in the closed position (FIG. 5) until the demand for steering fluid has been satisfied and the fluid pressure in the left variable volume chamber 86 is sufficient to cause the secondary valve member 96 to shift rightwardly to the open position (FIG. 3). It should be noted that when the secondary member 96 is in the closed position of FIG. 5, there is no fluid flow through the orifice 68 and the fluid pressure in the chamber 86 is equal to the fluid pressure in the chamber 88 so that the spring 90 holds the main valve member 92 closed.

Figure 5:
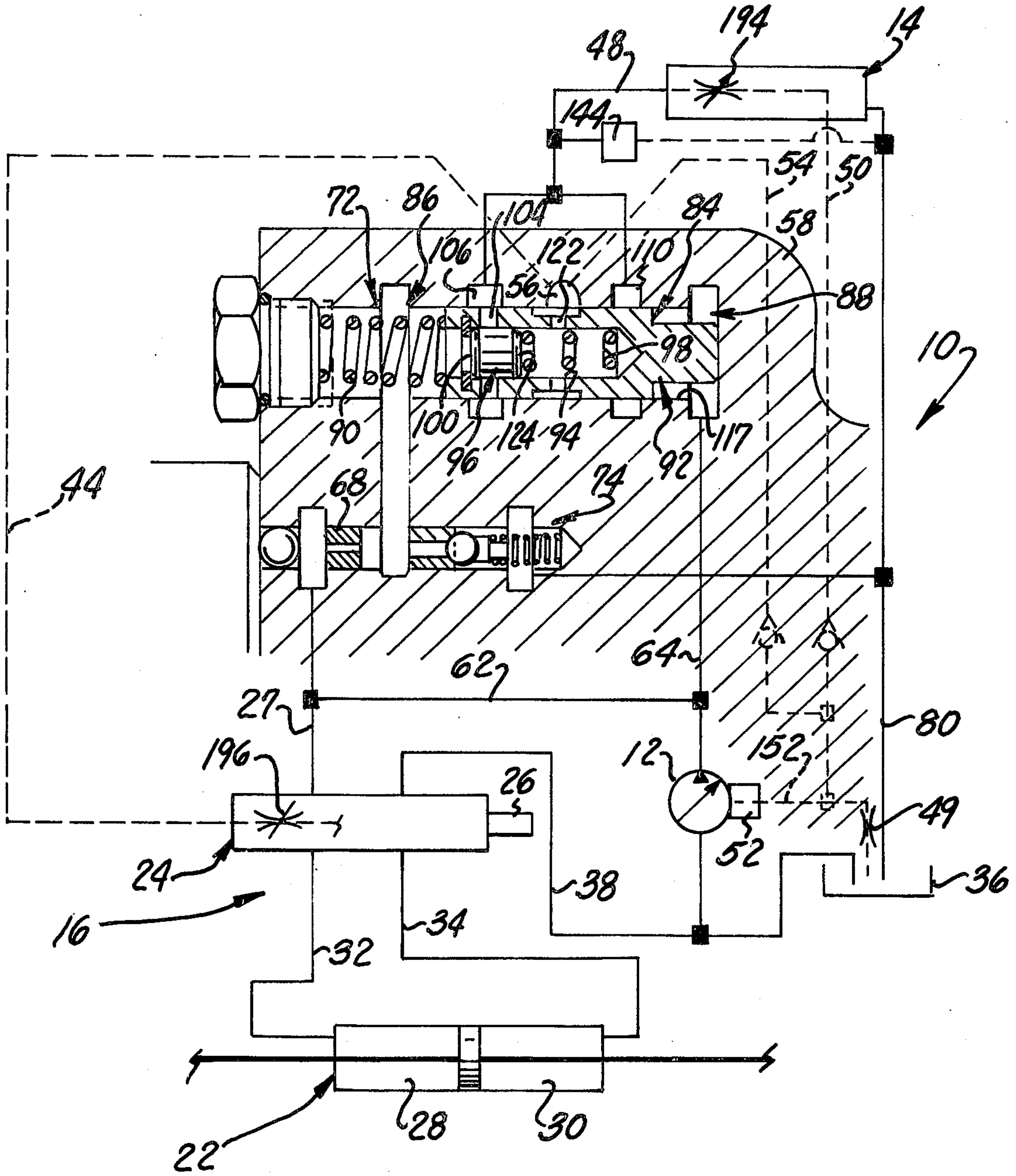
FIG. 5 is a schematic illustration, generally similar to FIG. 1, illustrating the condition of the fluid flow control apparatus during a portion of a steering operation in which the steering apparatus requires the entire fluid output from the pump.

When the displacement of the pump 12 has been increased to satisfy the demand for steering fluid, the fluid pressure in the left chamber 86 is sufficient to cause the secondary valve member 96 to shift from the closed position of FIG. 5 to the open position of FIG. 3. At this time, the steering load signal pressure supplied to the conduit 44 is reduced to a pressure which is less than the pump output pressure so that the combined influence of the pressure in the chamber 94 and the spring 98 are ineffective to close the valve 96 against the pressure in the left chamber 86.

Figure 4:
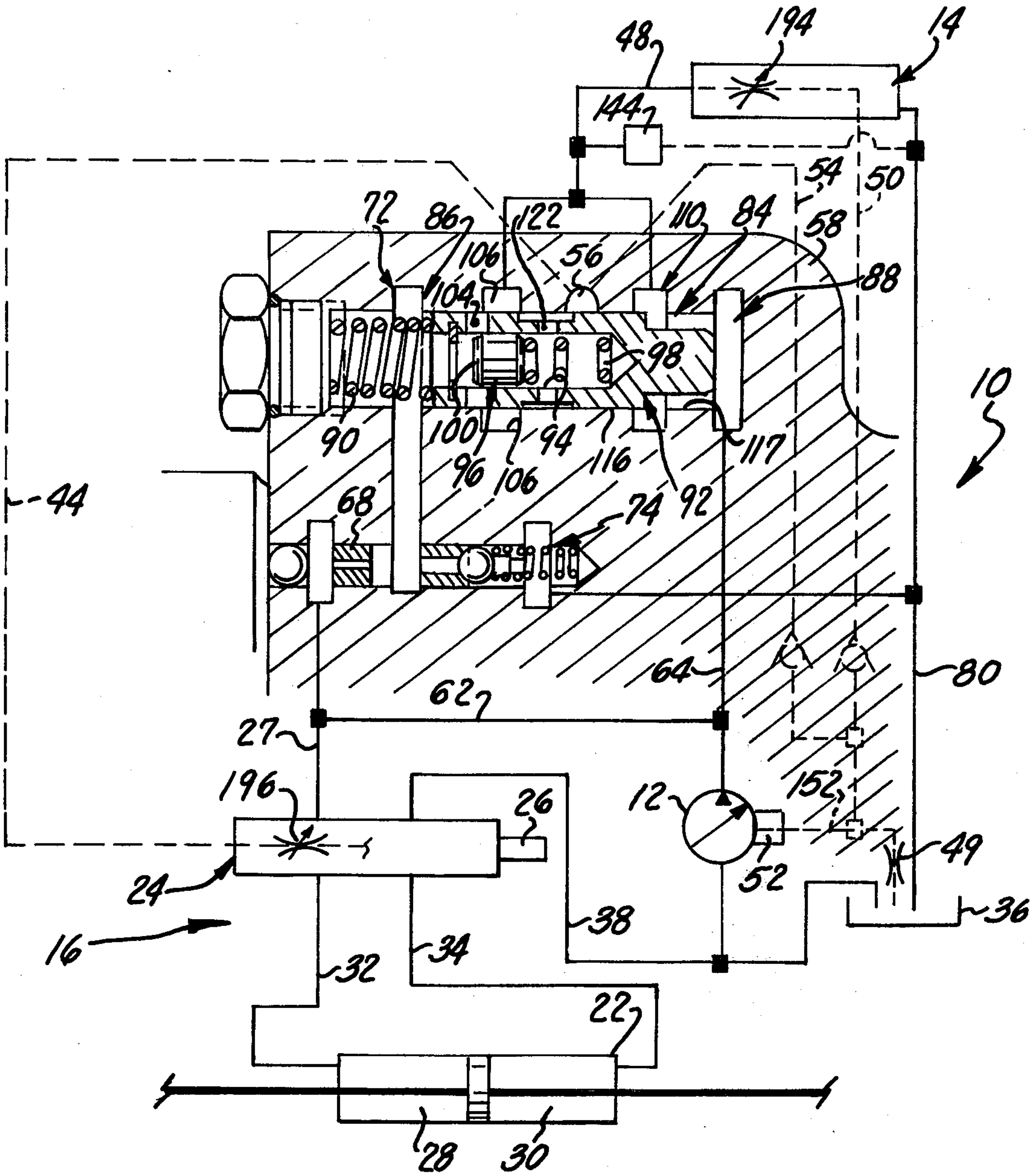
FIG. 4 is a schematic illustration, generally similar to FIG. 1, illustrating the condition of the fluid flow control apparatus during simultaneous operation of the power steering apparatus and the auxiliary apparatus.

After the demand for steering fluid has been satisfied and the secondary valve member 96 has returned to the open position of FIG. 3, the auxiliary apparatus 14 can be actuated. Actuation of the auxiliary apparatus 14 reduces the fluid pressure in the left chamber 86 in the manner previously explained so that the main valve member 92 is shifted to the open position of FIG. 4.

After the main valve member 92 has moved to the open position (FIG. 4), the auxiliary apparatus 14 is operated under the influence of fluid flow through both the port 106 and the port 110. However, if the combined demand by the auxiliary apparatus 14 and the steering apparatus 16 exceeds the capability of the pump 12 to supply fluid, the pressure in the right variable volume chamber 88 is decreased. The main valve member 92 then shifts rightward from the open position of FIG. 4 to the closed position of FIG. 3 under the combined influence of the pressure in the left variable volume chamber 86 and the spring 90. If this is not sufficient to satisfy the demand for steering fluid, the secondary valve member 96 moves to the closed position blocking fluid flow through the port 104 (FIG. 5).

As the demand for steering fluid is satisfied, the fluid pressure signal transmitted through the conduit 44 to the chamber 94 is reduced. This enables the secondary valve member 96 to shift rightwardly from the closed position shown in FIG. 5 to the open position shown in FIG. 3 under the influence of the pressure in the chamber 86. Of course, if the auxiliary apparatus is being actuated, the main valve member 92 can then shift to the open condition of FIG. 4.

At the end of a steering operation, the input shaft 26 to the steering controller 24 ceases to rotate and a valve member in the steering controller 24 blocks fluid flow through the conduits 32 and 34 to hydraulically lock the steering motor 22 and hold the wheels 18 and 20 against sidewise turning movement. In addition, the valve member in the steering controller 24 connects the conduit 44 with the d rain or reservoir conduit 38 at the end of the steering operation. This reduces the steering load pressure signal transmitted to the port 56 in the housing 58. The reduction in fluid pressure at the port 56 is conducted to the control assembly 52 through the conduit 54 to effect a reduction in the displacement of the pump 12.

It is contemplated that a steering operation may be initiated immediately after initiation of operation of the auxiliary apparatus 14 and when the fluid flow control apparatus 10 is in the condition illustrated in FIG. 2. Upon initiation of the steering operation, the pump 12 will undoubtedly have insufficient displacement to meet the demand for fluid by both the steering apparatus 16 and the auxiliary apparatus 14. Therefore the fluid pressure in the right variable volume chamber 88 decreases and the main valve member 92 moves from the open position (FIG. 2) to the closed position (FIG. 3) under the influence of the pressure in the chamber 86 and the spring 90. The main valve member 92 remains closed until the displacement of the pump 12 has increased sufficiently to supply the demand for fluid by both the steering apparatus 16 and the auxiliary apparatus 14. Of course, if the demand for steering fluid is sufficiently great, the fluid pressure in the chamber 94 is sufficient to move the secondary valve member 96 to the closed position of FIG. 5.

In order to prevent the build up of excessive fluid pressure in the conduit 48, a high pressure relief valve 144 is provided between the conduit 48 and the drain conduit 80.

The displacement control assembly 52 includes a flow compensator valve 150 (FIG. 6) which is actuated under the influence of a load signal transmitted through a conduit 152 from either the auxiliary apparatus 14 or the steering apparatus 16. Actuation of the flow compensator valve 150 effects operation of a motor 154 to move a displacement control member 156 to vary the displacement of the pump 12. Although the pump 12 may be any one of several known variable displacement types, the pump is of the well known axial piston type and has a rotatable barrel with a plurality of cylinders in which pistons are slidably disposed. The barrel is continuously rotated and the displacement of the pump is varied between minimum and maximum displacement conditions by moving a swashplate or displacement control member 156. The swashplate is biased to a maximum displacement condition under the influence of a spring 158.

When the auxiliary apparatus 14 and steering apparatus 16 are in an inactive condition, the fluid pressure in the load signal conduit 152 is minimal and a fluid pressure signal conducted through a conduit 162 from the outlet of the pump is effective to shift a valve spool 164 toward the left (as viewed in FIG. 6) to port high pressure pump outlet fluid through a conduit 166 to the chamber 168 of the swashplate motor 154. This high pressure fluid moves the swashplate 156 against the influence of the spring 158 to minimize the displacement of the pump 12. Upon initiation of operation of either the auxiliary apparatus 14 or the steering apparatus 16, a relatively high pressure load signal is transmitted through the conduit 152 to a pressure chamber 170 in the compensator valve assembly 150. This high pressure fluid acts against a cylindrical land 172 on the valve spool 164 along with a biasing spring 174 to shift the valve spool toward the right from the closed position illustrated in FIG. 6. This rightward movement of the valve spool 164 connects a drain or reservoir conduit 178 with the motor cylinder chamber 168. When this occurs, fluid is exhausted from the motor cylinder chamber through the conduit 166 to an annular groove 180 extending around a second land 182 of the valve 164. The annular groove or passage 180 is connected in fluid communication with a second annular passage 184 by a bypass conduit 186. Since the valve spool 164 has been moved rightwardly (as viewed in FIG. 6) from the closed position, the fluid is exhausted from the annular groove 184 to the drain conduit 178. As fluid is exhausted from the motor cylinder chamber 168, the spring 158 moves the swashplate 156 to increase the displacement of the pump 12.

Increasing the displacement of the pump 12 increases the rate at which fluid is discharged from the pump to the auxiliary apparatus 14 and/or the steering apparatus 16. When the rate of fluid flow from the pump is sufficient to satisfy the demand for fluid by the auxiliary apparatus 14 and/or the steering apparatus 16, the fluid pressure output signal in the conduit 162 will balance the effect of the spring 174 and load signal transmitted to the chamber 170 through the conduit 152. This causes the valve spool 164 to return to the closed position illustrated in FIG. 6 to maintain the displacement of the pump 12 constant. If the demand for fluid should increase, the load pressure signal transmitted through the conduit 152 would increase with a resulting shifting of the valve spool 164 against the influence of the pressure input signal from the pump. When the demand for fluid has been satisfied, the input pressure signal from the pump will cause the valve spool 164 to shift back to the closed position illustrated in FIG. 6.

When operation of the auxiliary apparatus 14 and/or the steering apparatus 16 is interrupted, the load pressure signal conduits 50 and/or 54 are drained through the orifice 49 (see FIG. 1). This results in a reduction in the fluid pressure in the chamber 170 so that the pump input pressure signal through the conduit 162 is effective to shift the valve spool 164 toward the left (as viewed in FIG. 6). This connects the conduit 166 with the output from the pump so that fluid under pressure is conducted to the motor cylinder chamber 168 to move the swashplate 156 back toward the minimum displacement position against the influence of the spring 158. The manner in which the displacement control assembly 52 cooperates with the pump 12 is the same as is described in U.S. patent application Ser. No. 521,236 filed Nov. 6, 1974 by Jim Lee Rau and entitled "Vehicle Steering System".

In accordance with another feature of the present invention, the flow control apparatus 10 includes a pair of variable size orifices which are effective to vary the load signal transmitted to the pump displacement control assembly 52 upon actuation of either the auxiliary apparatus 14 or the steering apparatus 16. Thus, a variable size orifice 194 is associated with the auxiliary apparatus 14 and another variable size orifice 196 is associated with the steering apparatus 16. When the auxiliary apparatus 14 is in an inactive condition, the variable size orifice 194 is closed blocking fluid flow from the conduit 48 to the conduit 50. Upon activation of the auxiliary apparatus 14, the variable size orifice 194 is opened to transmit a load signal to the conduit 50. The extent to which the orifice is opened varies as a direct function of the demand for fluid by the auxiliary apparatus 14.

When the auxiliary apparatus 14 is to be operated at a relatively high speed and a relatively large amount of fluid is required, a suitable control member (not shown) is actuated to open the orifice 194 to a relatively large extent so that there is a small pressure drop across the orifice 194 and the auxiliary apparatus load pressure signal transmitted to the conduit 50 approaches the fluid pressure in the conduit 48. However, if the auxiliary apparatus 14 is to be operated at a relatively low speed so that there is a small demand for fluid or is to be operated through a relatively small distance, the orifice 194 will be opened to only a small extent. Therefore, there will be a relatively large pressure drop across the orifice 194 and the auxiliary apparatus load pressure signal transmitted to the conduit 50 will be relatively small. Of course, the greater the pressure of the auxiliary apparatus load signal transmitted through the conduit 50 to the conduit 152 and the compensator valve assembly 150 the greater must be the pump output pressure signal transmitted through the conduit 162 to effect leftward movement of the valve spool 164 from a condition connecting the motor cylinder chamber 168 with the drain conduit 178 and the greater will be the resulting displacement of the pump 12.

Similarly, actuation of the steering control apparatus 16 varies the size of the orifice 196. When the steering control apparatus 16 is actuated to a relatively small extent, the orifice 196 remains relatively small so that there is a large pressure drop between the pump input conduit 27 and the load pressure signal transmitting conduit 44. Similarly, upon rapid actuation of the steering control apparatus 16 to a relatively large extent, the orifice 196 will be opened relatively wide so that there is a small pressure drop across the orifice and a relatively large steering apparatus pressure signal is transmitted to the conduit 44 and the compensator valve assembly 150. The manner in which the variable size orifice 196 cooperates with the pump displacement control assembly 52 is the same as is disclosed in U.S. patent application Ser. No. 521,236, filed Nov. 6, 1974 by Jim Lee Rau and entitled "Vehicle Steering System".

During operation of both the auxiliary apparatus 14 and steering apparatus 16, the two orifices 194 and 196 provide a combined load signal to the pump displacement control assembly 52. Of course, the extent or rate at which an input control member to either the auxiliary apparatus 14 or steering apparatus 16 is actuated, will vary the extent to which the associated one of the orifices 194 or 196 is actuated to thereby vary the combined load signal. It should be noted that the priority valve assembly 84 assures that there is adequate fluid for steering operations during operation of both the auxiliary apparatus 14 and steering control apparatus 16.

Although the auxiliary apparatus 14 and steering control apparatus 16 could include control valves of many different constructions, one specific control valve 200 is illustrated in FIG. 7. The control valve 200 is utilized in association with the auxiliary apparatus 14 and includes a valve spool 204 which is connected with the input conduit 48. A pair of output conduits 206 and 208 are connected with an auxiliary motor 210. An actuator 214 is operable to shift the valve body 204 to either the left or right from the illustrated neutral condition in which fluid flow to and from the motor 210 is blocked. Upon shifting movement of the valve body 204 toward the right as viewed in FIG. 7, a variable displacement orifice **194*a* (corresponding to the orifice 194 of FIGS. 1–5) ports high pressure fluid from the conduit 48 to the conduit 206 leading to the motor 210. In addition, a passage 216 ports fluid pressure from the downstream side of the variable size orifice 194*a* to the conduit 50.**

The greater extent to which the valve spool 204 is shifted, the greater the size of the orifice **194*a* and the smaller is the pressure drop between the conduit 48 and the conduit 50 so that the auxiliary apparatus load signal transmitted to the pump displacement control assembly 52 varies as a direct function of the extent of operation of the valve assembly 200. It should be noted that a passage 218 connects the opposite side of the motor 210 with the drain conduit 80.**

Upon actuation of the auxiliary control valve assembly 200 in the opposite direction, the valve spool 204 is shifted toward the left (as viewed in FIG. 7). This ports high pressure fluid from the conduit 48 through the variable size orifice 194b (corresponding to the orifice 194 of FIGS. 1–5) to the conduit 208 leading to the auxiliary motor 210. An internal passage 222 ports high pressure fluid from the downstream side of the orifice 194b to the conduit 50. The size of the orifice 194b varies with variations in the extent to which the auxiliary control valve 200 is actuated. A valve passage 224 is effective at this time to conduct return fluid to the drain conduit 80.

A suitable feedback device, indicated schematically at 230 in FIG. 7 is provided to return the valve assembly 200 to its initial condition upon operation of the auxiliary apparatus motor 210 to an extent corresponding to the extent of operation of the valve assembly 200. It is contemplated that the feedback device can be of many different known types including the well known floating link type similar to that disclosed in U.S. Pat. No. 1,947,138.

A control valve utilized in association with the steering apparatus is constructed and functions in a manner generally similar to the control vave 200. However, it is preferred to utilize a control valve in association with a steering apparatus which is constructed in accordance with the valve disclosed in U.S. Pat. No. 3,931,711 and entitled "Controller Assembly". If desired, the valve assembly disclosed in U.S. Pat. No. 3,931,711 could be utilized in association with the auxiliary apparatus 14. If this valve assembly was utilized, the metering pump feedback arrangement disclosed therein would be used rather than a floating link type feedback arrangement.

In view of the foregoing, it can be seen that the flow control apparatus 10 is utilized in a vehicle having a steering apparatus 16 and auxiliary apparatus 14 which are supplied with fluid from the same variable displacement pump 12. The fluid flow control apparatus 10 includes a variable size orifice 194 associated with the auxiliary apparatus 14 and a variable size orifice 196 associated with the steering apparatus 16. Upon operation of the auxiliary apparatus 14 and/or the steering apparatus 16, the variable size orifice 194 and/or the variable size orifice 196 provide a load signal to the pump displacement control assembly 52. The pump displacement control assembly 52 varies the displacement of the pump 12 in response to variations in the load signal.

A priority valve assembly includes a pair of relatively movable valve members 92 and 96 which cooperate to at least partially define a chamber 94 connected in fluid communication with the steering apparatus 16 by the conduit 44. These relatively movable valve members 92 and 96 cooperate with a pair of outlet ports 106 and 110 which are connected in fluid communication with the auxiliary apparatus 14.

Upon initiation of a steering operation, the pressure in the chamber 94 increases and, if the demand for steering fluid is sufficiently large, relative movement occurs between the coaxial valve members 92 and 96 to block fluid flow through the pair of outlet ports 106 and 110 (FIG. 5) to the auxiliary device 14 until after the demand for steering fluid has been satisfied. Upon initiation of operation of the auxiliary apparatus 14 with the steering apparatus 16 inactive, fluid is initially supplied to the auxiliary apparatus through the outlet ports 106 and is subsequently supplied to the auxiliary apparatus through both of the outlet ports 106 and 110 (FIG. 2). If the steering apparatus is activated during operation of the auxiliary apparatus, the main valve member 92 closes to block the outlet port 110. If the demand for steering fluid is sufficiently great, the secondary valve member 96 is moved to the closed position to block the port 106. At this time a pressure signal from the controller 24 is utilized to effect an increase in the output of the variable displacement pump 12. When the output of the variable displacement pump 12 has increased to satisfy the demand for steering fluid, the valve members 92 and 96 move so that fluid is again supplied to the auxiliary apparatus.

Having described one specific preferred embodiment of the invention, the following is claimed:

1. Fluid flow control apparatus for use in a vehicle having a power steering apparatus and an auxiliary apparatus which are to be supplied with fluid from the same pump, said fluid flow control apparatus comprising a housing having a valve chamber, a plurality of port means in said housing for connecting the pump, power steering apparatus and auxiliary apparatus in fluid communication with said valve chamber, first and second relatively movable valve members disposed in said valve chamber, said first valve member at least partially defining a first chamber section within said valve chamber and being movable relative to said housing between an open position enabling fluid to flow from the pump through said first chamber section and port means to the auxiliary apparatus and a closed position at least partially blocking fluid flow from the first chamber section through said port means to the auxiliary apparatus, said second valve member being movable relative to said housing and first valve member between an open position enabling fluid to flow from the pump through said port means to the auxiliary apparatus and a closed position at least partially blocking fluid flow from the pump to the auxiliary apparatus, said first and second valve members having surfaces which at least partially define a second chamber section within said valve chamber, and conduit means for conducting variations in fluid pressure to said first and second chamber sections to effect relative movement between said first and second valve members to their closed positions in response to demand by the power steering apparatus for fluid at a flow rate which is at least as great as the fluid flow rate from the pump when said first and second valve members are in their open positions.

2. An apparatus as set forth in claim 1 wherein said second valve member is disposed within said first valve member, said second valve member being movable with said first valve member upon movement of said first valve member between its open and closed positions.

3. An apparatus as set forth in claim 1 wherein said first valve member moves in a first direction relative to said housing upon movement of said first valve member from its open position to its closed position, said second valve member being movable relative to said housing in a second direction which is opposite to said first direction upon movement of said second valve member from its open position to its closed position.

4. An apparatus as set forth in claim 1 wherein said plurality of port means includes first and second spaced apart ports disposed within said housing and connected in fluid communication with the auxiliary device, said first valve member being effective to block said first port and ineffective to block said second port when said first valve member is in its closed position, said first valve member being ineffective to block said first and second ports when said first valve member is in its open position, said second valve member being effective to block said second port when said second valve member is in its closed position.

5. An apparatus as set forth in claim 1 wherein said plurality of port means includes first and second spaced apart fluid inlet ports connecting the pump in fluid communication with said valve chamber and first and second spaced apart fluid outlet ports connected in fluid communication with the auxiliary apparatus, said first valve member being effective to direct fluid flow from said first inlet port to said first outlet port and to direct fluid flow from said second inlet port to said second outlet port when said first valve member is in its open position, said first valve member being effective to block fluid flow from said first inlet port to said first outlet port and to direct fluid flow from said second inlet port to said second outlet port when said first valve member is in its closed position.

6. An apparatus as set forth in claim 5 wherein said second valve member is ineffective to block fluid flow from said second inlet port to said second outlet port when said second valve member is in its open position, said second valve member being effective to block fluid from said second inlet port to said second outlet port when said second valve member is in its closed position.

7. An apparatus as set forth in claim 6 wherein said plurality of port means further includes a third inlet port connecting the power steering apparatus in fluid communication with said second chamber section, said first and second valve members being ineffective to block fluid flow through said third inlet port.

8. An apparatus as set forth in claim 7 wherein said first outlet port is disposed to one side of said third inlet port and said second outlet port is disposed to another side of said third inlet port.

9. An apparatus as set forth in claim 1 wherein said second valve member and said second chamber section are disposed within said first valve member.

10. An apparatus as set forth in claim 9 wherein said plurality of port means includes a first port connecting said valve chamber in fluid communication with the power steering apparatus, said first valve member including surface means defining a port connecting said second chamber section in fluid communication with said first port.

11. An apparatus as set forth in claim 9 further including first spring means disposed in said valve chamber for urging said first valve member toward its closed position and second spring means disposed in said second chamber section for urging said second valve member toward its closed position.

12. Fluid flow control apparatus for use in a vehicle having a power steering apparatus and an auxiliary apparatus which are to be supplied with fluid from the same pump, said fluid flow control apparatus comprising a housing, surface means for at least partially defining a valve chamber in said housing, a movable valve member disposed within said valve chamber and cooperating with said surface means to form a first variable volume chamber adjacent to one end portion of said valve member and to form a second variable volume chamber adjacent to another end portion of said valve member, said valve member being movable in said valve chamber under the influence of fluid pressure to simultaneously vary the volume of said first and second variable volume chambers, a first inlet port connected in fluid communication with said first variable volume chamber and with the pump, a second inlet port connected in fluid communication with said second variable volume chamber and with the pump, first and second spaced apart outlet ports disposed between said inlet ports and connected in fluid communication with said valve chamber and the auxiliary apparatus, said valve member being movable in said valve chamber between first and second positions, said valve member being effective to enable fluid to flow from said first variable volume chamber through said first outlet port to the auxiliary apparatus and to block fluid flow from said second variable volume chamber through said second outlet port to the auxiliary apparatus when said valve member is in said first position, said valve member being effective to enable fluid to flow from said second variable volume chamber through said second outlet port to the auxiliary device when said valve member is in said second position, said valve member having first surface means exposed to the fluid pressure in said first variable volume chamber to effect movement of said valve member from the second position to the first position in response to a decrease in the fluid pressure in said second variable volume chamber relative to the fluid pressure in said first variable volume chamber, said valve member having second surface means exposed to the fluid pressure in said second variable volume chamber to effect movement of said valve member from the first position to the second position in response to a decrease in the fluid pressure in said first variable volume chamber relative to the fluid pressure in said second variable volume chamber, control means for effecting a reduction in the fluid pressure in said first variable volume chamber relative to the fluid pressure in said second variable volume chamber to effect movement of said valve member to said second position in response to initiation of operation of the auxiliary apparatus with the steering apparatus in an inactive condition and said valve member in said first position, and means for effecting a reduction in the fluid pressure in said second variable volume chamber relative to the fluid pressure in said first variable volume chamber to effect movement of said valve member to said first position upon initiation of operation of the steering apparatus during operation of the auxiliary apparatus with said valve member in said second position.

13. An apparatus as set forth in claim 12 further including means for at least partially blocking fluid flow from said first variable volume chamber through said first outlet port during operation of the power steering apparatus with said valve member in said first position.

14. An apparatus as set forth in claim 13 wherein said means for at least partially blocking fluid flow from said first variable volume chamber includes a movable valve element disposed within said valve member and cooperating with said valve member to at least partially define a third variable volume chamber, said valve element being movable between a first position in which it is ineffective to block fluid flow from said first variable volume chamber and a second position in which said valve element is effective to at least partially block fluid flow from said first variable volume chamber through said first outlet port, means for varying the fluid pressure in said third variable volume chamber in response to initiation of operation of the steering apparatus to effect movement of said movable valve element from its first position to its second position.

15. Fluid flow control apparatus for use in a vehicle having a power steering apparatus and an auxiliary apparatus which are to be supplied with fluid from the same variable displacement pump, said fluid flow control apparatus comprising displacement varying means for varying the displacement of the pump, means for providing a steering load signal which varies upon variations in the demand for fluid by the power steering apparatus, said means for providing a steering load signal including a first variable size orifice connected in fluid communication with said displacement varying means and said pump means during operation of the steering apparatus and means for varying the size of said first orifice upon a change in the demand for fluid by the steering apparatus to vary the fluid pressure differential across said first orifice, means for providing an auxiliary apparatus load signal which varies upon variations in the demand for fluid by the auxiliary apparatus, said means for providing an auxiliary apparatus load signal including a second variable size orifice connected in fluid communication with said displacement varying means and said pump means during operation of the auxiliary apparatus and means for varying the size of said second orifice upon a change in the demand for fluid by the auxiliary apparatus to vary the fluid pressure differential across said second orifice, said displacement varying means including means for effecting a variation in the displacement of the pump in response to a variation in the fluid pressure differential across one of said variable size orifices during operation of the power steering apparatus and/or the auxiliary apparatus.

16. An apparatus as set forth in claim 15 further including priority valve means for blocking fluid flow to the auxiliary apparatus and to said second variable size orifice in response to the demand by the power steering apparatus for a quantity of fluid which exceeds the output of the pump during simultaneous operation of the power steering apparatus and the auxiliary apparatus.

17. An apparatus as set forth in claim 16 wherein said priority valve means includes a housing having a valve chamber, a plurality of port means in said housing for connecting the pump, power steering apparatus and auxiliary apparatus in fluid communication with said valve chamber, first and second relatively movable valve members disposed in said valve chamber, said first valve member at least partially defining a first chamber section within said valve chamber and being movable relative to said housing between an open position enabling fluid to flow from the pump through said first chamber section and port means to the auxiliary apparatus and a closed position at least partially blocking fluid flow from the first chamber section through said port means to the auxiliary apparatus, said second valve member being movable relative to said housing and first valve member between an open position enabling fluid to flow from the pump through said port means to the auxiliary apparatus and a closed position at least partially blocking fluid flow from the pump to the auxiliary apparatus, said first and second valve members having surfaces which at least partially define a second chamber section within said valve chamber, and conduit means for conducting variations in fluid pressure to said first and second chamber sections to effect movement between said first and second valve members to their closed positions in response to demand by the power steering apparatus for fluid at a flow rate which is at least as great as the fluid flow rate from the pump when said first and second valve members are in their open positions.

18. An apparatus as set forth in claim 17 wherein said pump is connected in fluid communication with one side of said first orifice and said conduit means is connected in fluid communication with the opposite side of said first orifice, said means for varying the size of said first orifice upon a change in demand for fluid being effective to increase the size of said first orifice in response to an increase in the demand for steering fluid to thereby effect an increase in the pressure conducted b;y said conduit means to one of said chamber sections to effect relative movement between said first and second valve members.

19. An apparatus as set forth in claim 15 further including a first follow-up means connected with the steering apparatus and said first orifice for effecting a variation in the size of said first orifice in response to operation of the power steering apparatus, and a second follow-up means connected with the auxiliary apparatus and said second orifice for effecting a change in the size of said second orifice in response to operation of the auxiliary apparatus.

20. An apparatus as set forth in claim 15 wherein said displacement varying means includes an actuator means which is operable to vary the displacement of the pump and pressure responsive valve means for controlling fluid flow to said actuator means, said fluid flow control apparatus further including conduit means for conducting to said pressure responsive valve means a control fluid pressure which varies upon variations in the demand for fluid pressure by the steering apparatus and upon variations in the demand for fluid by the auxiliary apparatus.

* * * * *